June 20, 1961  M. D. KULIK  2,989,458
LIQUID CARBON BLACK FEEDSTOCK
Filed May 13, 1958  2 Sheets-Sheet 1
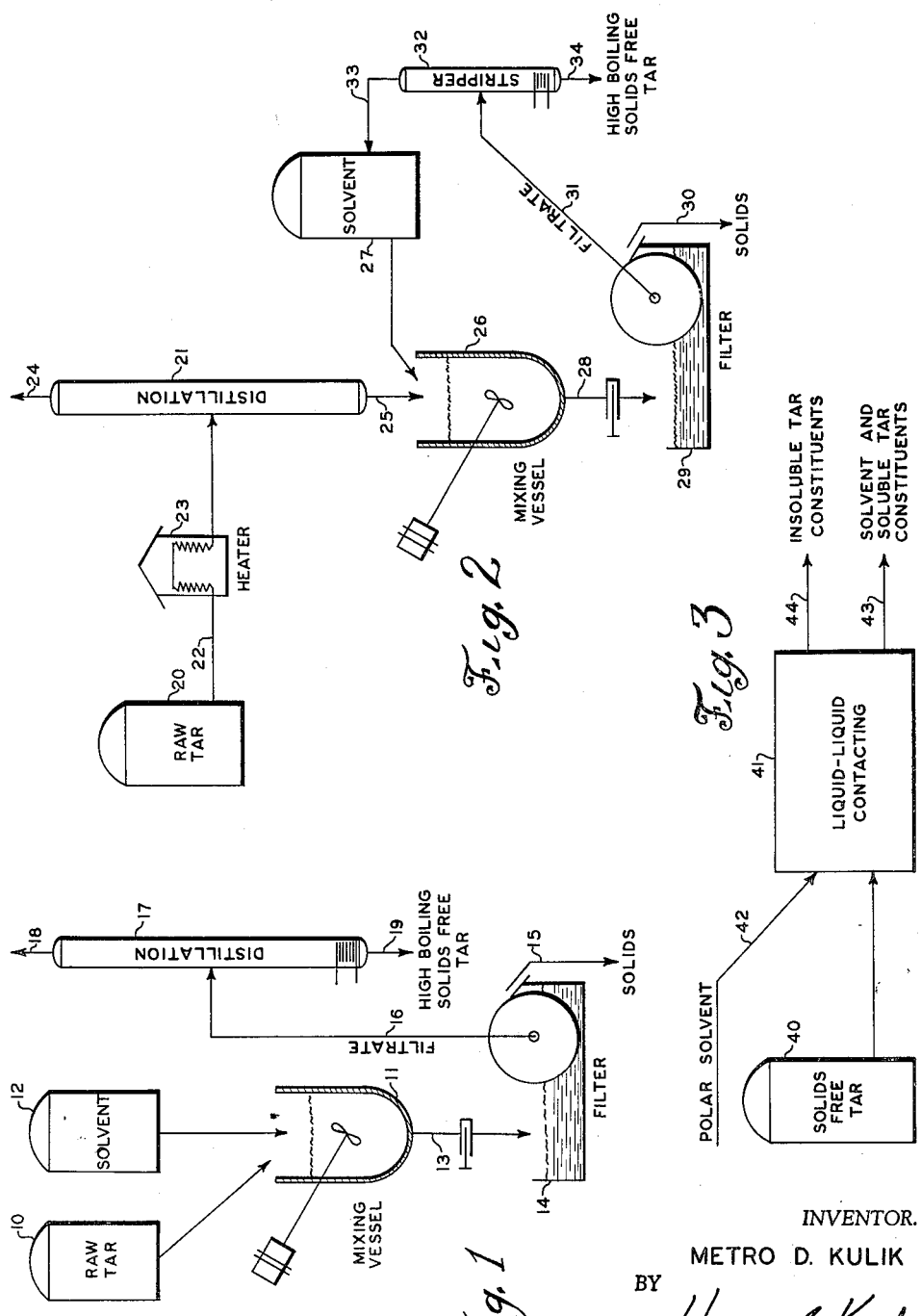
INVENTOR.
METRO D. KULIK
BY
Harry B. Keck
HIS ATTORNEY June 20, 1961 M. D. KULIK 2,989,458
LIQUID CARBON BLACK FEEDSTOCK
Filed May 13, 1958 2 Sheets-Sheet 2

INVENTOR.
METRO D. KULIK
BY
Harry B. Keck
HIS ATTORNEY

United States Patent Office 2,989,458
Patented June 20, 1961

2,989,458
LIQUID CARBON BLACK FEEDSTOCK
Metro D. Kulik, Pittsburgh, Pa., assignor to Consolidation Coal Company, Pittsburgh, Pa., a corporation of Pennsylvania
Filed May 13, 1958, Ser. No. 734,994
16 Claims. (Cl. 208—8)

The present invention relates to carbon black feedstock derived from coal and analogous naturally occurring hydrocarbonaceous solids.

BACKGROUND

The term "carbon black" is applied to finely divided particles consisting essentially of carbon which are produced by incomplete combustion of hydrocarbonaceous fuels, both liquid and gaseous. The carbon black industry has seen many varied processes for producing its products. The product carbon black frequently is identified by designating the method of preparation, e.g., channel black, lamp black, furnace black. The present invention is concerned with a feedstock for preparing furnace black which predominates the present day industry.

The carbon black industry has confronted the problem of procuring satisfactory feedstock in sufficient supply. In the early days of the industry, channel black produced from natural gas comprised the bulk of the carbon black market. As the industry developed, new uses for natural gas were uncovered and the price of natural gas gradually increased. At the present time, the majority of the carbon black market is supplied through furnace blacks produced from oil. The oils which are used in the preparation of carbon black must possess special qualities which are frequently difficult to reproduce. At the present time carbon blacks are produced almost exclusively from petroleum derived feedstock.

Some lamp black has been produced in the past from coke oven tar fractions. Creosote oil distillate boiling from about 230 to 400° C. has been employed as a lamp black feedstock in the United States. Anthracene oil boiling from about 230 to 400° C. is employed in Europe as a feedstock for furnace black.

Anthracene oil, obtained as a distillate from coke oven tar, is an excellent liquid carbon black feedstock, according to European reports and tests conducted in the United States. However there is no commercial carbon black production from anthracene oil in the United States because of its higher cost in contrast with petroleum derived liquids.

There have been several attempts to prepare a liquid carbon black feedstock from low temperature carbonization tar distillates which have been discouraging because the yield of carbon black was low in comparison with the yield from petroleum-derived feedstocks at the same furnace conditions. The quality of carbon black obtained from low temperature carbonization tar distillates has been poor in comparison to that obtained with petroleum-derived feedstocks.

Furnace black production has become a highly developed art. Furnace technology is well understood. A liquid hydrocarbonaceous feedstock is sprayed in an atomized stream into a highly heated chamber where the droplets are vaporized virtually instantaneously and decomposed to carbon particles which are collected as product. Many advances have been made in furnace design and definition of optimum furnace conditions since the introduction of the liquid furnace process in the early 1940's.

LOW TEMPERATURE COAL PYROLYSIS

Pyrolysis of coal at low temperatures is a recognized art which yields products distinct from the products of high temperature pyrolysis. By low temperatures, the range of about 800 to 1400° F. is intended as opposed to temperatures above about 1800° F. comprehended by high temperature pyrolysis. The outstanding example of high temperature pyrolysis is the conventional coke oven. The outstanding example of low temperature pyrolysis is low temperature coal carbonization although low temperature coking of liquid coal products also is comprehended. Such liquid coal products include, for example, low temperature carbonization tar and extracts obtained by treating coal with a suitable solvent. Tar and solvent coal extract may be pyrolyzed at low temperatures by delayed coking, contact coking and fluidized coking, for example. The condensed coker vapors possess properties corresponding to those of low temperature coal carbonization tar. The present invention will be described by specific reference to low temperature coal carbonization.

Low temperature coal carbonization envisages heating coal to a temperature of 800 to 1400° F. whereby devolatilization occurs to yield as product a low volatile solid termed "char," vaporized liquids condensible as tar, and non-condensible gases. Tar yields ranging from about 15 to 50 gallons per ton of coal can be achieved depending upon the starting coal and the specific carbonization conditions. The tar is a heterogeneous mixture of hydrocarbonaceous materials in combination with organic compounds containing oxygen, sulfur and nitrogen. The condensible tar has an initial boiling temperature as low as about 150° C. and includes materials boiling above about 500° C. The tar is predominantly less aromatic in character than the highly aromatic conventional coke oven tar.

Tar from low temperature carbonization comprises vaporized materials which are generated from coal at the relatively low temperatures of 800 to 1400° F. The tar is recovered without exposure to more elevated temperatures which would tend to crack, decompose and reform the material. When tar is produced in a high temperature carbonization process (e.g., above about 1400° F.) such as a conventional coke oven, the similar primary materials are cracked, decomposed and reformed to yield a more highly aromatic tar in significant lower quantity (based on gallons per ton of coal) along with substantially increased quantities of gases and light oils. Thus low temperature carbonization tar has a higher hydrogen-to-carbon ratio, a higher molecular weight and a higher oxygen content than coke oven tar.

A further gross distinction between low temperature tar and conventional coke oven tar exists in the analytically defined properties of "benzene insolubles" and "quinoline insolubles." These materials are those tar ingredients which are not soluble in the stated solvents. With coke oven tar, they comprise finely divided carbonaceous particles which are quite similar to carbon black. These particles are formed during the extremely high temperature treatment which the coke oven tars experience in coke ovens from the instant of generation out of a coal particle until removal from the coke oven. The materials in low temperature tar which are insoluble in benzene and quinoline are not similar to carbon black, but instead, are high molecular weight hydrocarbonaceous materials. There is no exposure of low temperature tar to very high temperature conditions between its instant of generation and its recovery.

Virtually every known materials handling technique has been suggested for use in low temperature carbonization processing systems. The most promising systems have employed some form of agitation, e.g., rotating kilns, moving belts, and the like. The advent of the fluidized solids contacting technique in the past decade developed substantial interest in fluidized low temperature carbonization systems.

All of these agitated systems develop clouds of fine particles of coal and partially devolatilized coal within the carbonization zone. These fine particles are entrained in the evolved carbonization vapors including tar vapors and non-condensible gases. The solid particles are condensed from the vapor stream and appear as contaminants in the raw product tar.

A typical analysis of raw tar from a fluidized low temperature carbonization system is set forth in Table I.

Table I.—Raw tar composition

| Component: | Weight percent |
|---|---|
| Solids | 28.4 |
| Moisture | 4.4 |
| Tar— | |
| Boiling below 230° C. | 11.0 |
| 230–300° C. | 4.9 |
| 300–400° C. | 16.1 |
| Boiling above 400° C. | 35.2 |
| Total | 100.0 |

Elimination of the solid particles from the raw tar can be accomplished as described in my U.S. Patent 2,774,716, my copending application S.N. 515,647, filed June 15, 1955, now U.S. Patent 2,871,181, and my copending application S.N. 695,006, filed November 7, 1957, and since abandoned.

The tar fraction boiling below about 230° C. comprises principally volatile tar acids (phenol, cresols, xylenols) and neutral oils along with small quantities of tar bases (nitrogenous compounds) and sulfur compounds. The tar fraction boiling between about 230 and 300° C. comprises higher boiling tar acids (i.e., phenolic compounds) and neutral oils which are useful in creosote. The tar fractions boiling between 300 and 400° C. and boiling above 400° C. represent about half of the raw tar product from low temperature carbonization. These are the fractions toward which the present application is principally directed.

OBJECTS

The principal object of this invention is to provide a carbon black feedstock from low temperature carbonization tar from which carbon black can be produced in high yield.

A further object is to provide a carbon black feedstock from low temperature carbonization tar from which carbon black can be produced in a yield which is comparable to that of acceptable petroleum-derived feedstocks.

Another object of this invention is to provide an outlet for a substantial portion of low temperature carbonization tar.

A still further object of a refined embodiment of this invention is to provide a carbon black feedstock from low temperature carbonization tar from which carbon black can be produced in high yield and high quality compared to that of acceptable petroleum-derived feedstocks.

CARBON BLACK FEEDSTOCK

According to the present invention, the highest boiling fractions of coal pyrolysis products are incorporated into a liquid feedstock suitable for carbon black manufacture. Hitherto carbon black manufacturers have imposed stringent specifications on carbon black feedstock which have been predicated upon the properties of petroleum-derived feedstocks empirically found to be acceptable. Since low temperature carbonization tar products have not conformed to the empirical and artificial specifications, there has been little interest in low temperature carbonization tar products as carbon black feedstocks. One disturbing feature has been the high oxygen content of low temperature tar fractions. Another disturbing feature has been the high "asphaltene" content of low temperature carbonization tar products. I have found that neither of these features is necessarily limiting on the suitability of a low temperature tar product as a carbon black feedstock.

I have found that the lack of success in previous attempts to prepare carbon black from low temperature tar products has resulted not so much from what has been included in the material (e.g., oxygenated materials and asphaltenes) as from what has been removed from the material, specifically the very high boiling constituents of the high boiling fractions. Previous carbon black tests have been made with distillate fractions of the low temperature tar to assure avoidance of nozzle plugging in carbon black furnaces. Distillation of the high boiling fractions of low temperature tar necessarily leaves a residue of highest boiling portions in the distillation equipment. Furthermore, there is some thermal degradation of the very highest boiling constituents which are vaporized during distillation. Thus, when distillation is employed to produce a high boiling fraction of low temperature tar as distillate product, the very best ingredients for carbon black production are either left behind in the still or are destroyed. Hence the carbon black yields (based on gallons of feedstock entering the carbon black furnace) have been low where low temperature tar distillates have been tested.

This has not been the result with tar distillates obtained from coke oven tar. Coke oven tar distillates boiling in the range from about 250 to 400° C. are quite suitable as carbon black feedstock from the standpoint of carbon black yield.

According to the present invention, I produce a solids-free low temperature tar product having an initial boiling temperature in the range of about 300 to 425° C. which contains nearly all of the selective-solvent-soluble raw tar constituents boiling above 425° C. in the original tar. The preferred selective solvent comprises a low boiling fraction of low temperature carbonization tar containing from about 2 to 20 percent tar acids. The highest boiling tar constituents which are eliminated by my process are selectively those which adversely affect carbon black yield. Thermal degradation is avoided in my process. The carbon black yield from the tar product of my invention is comparable to that obtained from petroleum sources.

I accomplish this result by separating entrained solids from the high boiling portions of low temperature tar via a solvent treatment process. The selective solvent which I employ serves to dissolve most of the liquid constituents except for a portion which combines with the entrained solids to facilitate their complete removal from the solution of solvent and tar. Elimination of the solvent from the remaining solids-free tar solution leaves behind all of the high boiling tar liquid except for those constituents which are combined with the separated solids. The solids-free high boiling liquid is suitable as a carbon black feedstock.

Fortuitously, the portions of high boiling tar rejected by the solvent are selectively those which interfere with carbon black yield. Thus the tar which is soluble in the selective solvent includes the constituents which are beneficial in carbon black production.

The solvent treatment may be carried out with the whole tar product. The soluble tar portions boiling below the desired initial boiling temperature (between 300 and 425° C.) thereafter are flashed and recovered. Preferably, the whole tar is preliminarily flash vaporized to remove all constituents boiling below the desired initial boiling temperature (between 300 and 425° C.). The contaminating solid particles in the whole tar are thereby concentrated in the liquid phase high boiling residue which is subjected to the solvent treatment.

By employing solvent treatment of the high boiling portions of the tar and avoiding distillation, the carbon black yield from the product is substantially increased.

The preferred solvent for treating the tar comprises a low boiling fraction of low temperature carbonization tar containing from about 2 to 20 percent tar acids.

Further treatment of the high boiling tar with solvents may be provided to effect improvement in the quality of the resulting carbon black without lowering the high yields which I can achieve. Thus the tar product prepared according to this invention contains substantially all of the very high boiling constituents originally in the low temperature tar. The tar product has not been exposed to elevated distillation temperatures which would result in thermal degradation.

The present invention will be more fully described by reference to the following description and accompanying drawings in which:

FIGURE 1 is a schematic illustration of apparatus adapted to the practice of one embodiment of the present invention;

FIGURE 2 is a schematic illustration of apparatus adapted to the practice of an alternative preferred embodiment of the invention;

FIGURE 3 is a schematic illustration of a treating process which may be appended to the present process for improving the quality of the product;

Figure 4:
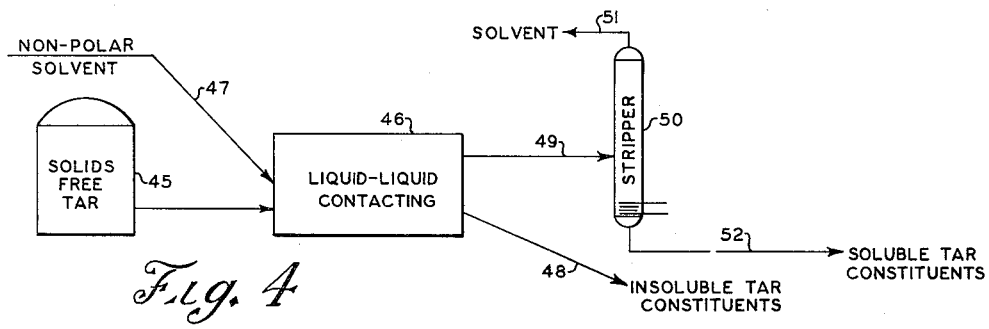
FIGURE 4 is a schematic illustration of an alternative treating process which may be appended to the present process for improving the quality of the product.

Referring to FIGURE 1, I have there illustrated one embodiment of the present invention corresponding to the process described in my U.S. Patent 2,774,716. Briefly, the illustrated process serves to remove finely divided solids consisting of coal and partially carbonized coal from raw low temperautre tar. Raw low temperature tar 10 is introduced into a mixing vessel 11 along with about 0.75 to 3.0 parts of a solvent 12. The tar and solvent are maintained under agitated conditions in the mixing vessel 11 at a temperature above the melting point of the tar, preferably in the range of 20 to 120° C. for raw tar. A solution is formed comprising the solvent and substantially all of the low temperature tar. A portion of the low temperature tar is insoluble in the solvent. The insoluble constituents of the tar coalesce with the finely divided particles of coal and partially carbonized coal which are maintained in agitation within the mixing vessel 11 and segregate from the solvent solution of soluble tar.

By selective use of various solvents, the segregation of solids occurs in different forms which affect both the configuration of the solids and the recovery of soluble tar. A solvent which has limited solvent properties for the tar will leave substantial quantities of undissolved tar as a tacky liquid phase in which the solvents are coalesced. A supernatant solution of such solvent and soluble tar is recoverable by simple decantation. By using as solvent a liquid which has greater solvent properties for the tar, the undissolved tacky tar can be limited in quantity to an amount sufficient to bind the solid particles into agglomerate pellets. The pellets can be separated by decantation, filtration or centrifugation. Solvents of this latter type have been described in my aforementioned U.S. Patent 2,774,716. A solvent of this latter type is assumed in the illustrative process specifically shown in FIGURE 1.

The solution and agglomerate particles are withdrawn from the mixing vessel 11 through a valved conduit 13 and introduced into a filter 14. The agglomerate particles are removed as a filter cake 15. The solids-free filtrate is recovered through a conduit 16.

In place of the filter 14, simple decantation or centrifugation may be employed. The solids-free filtrate is introduced from the conduit 16 into a distillation vessel 17 for separation of the solvent and substantially all of the tar constituents therein soluble and boiling below a final distillation temperature in the range 300 to 425° C. The solvent and distillate tar are recovered from an overhead condit 18. The solvent may be reused in the process. The distillate tar fraction contains all of the valuable low boiling tar acids and neutral oils and also the intermediate boiling tar acids and neutral oils which are useful as creosote.

The high boiling residue is recovered as a distillation bottoms product through a conduit 19. The distillation residue comprises all of the solvent-soluble original low temperature tar constituents boiling above the distillation temperature in the range of 300 to 425° C. Preferably, the distillation vessel 17 is operated under vacuum to volatilize the low boiling constituents at relatively low temperatures. Thus thermal degradation of the high boiling residue is avoided.

The distillation residue recovered through the conduit 19 may be employed directly as a carbon black feedstock. Carbon black can be produced in high yield from this distillation residue. If desired, the distillation residue in the conduit 19 may be further treated to improve the quality of the resulting carbon black as will be hereinafter described in connection with FIGURES 3 and 4.

Referring to FIGURE 2, a preferred embodiment of the present invention is illustrated corresponding to that more fully described in my copending application S.N. 695,006, filed November 7, 1957, entitled "Method for Removing Finely Divided Solid Particles From Low Temperature Carbonization Tars."

According to the process illustrated in FIGURE 2, the raw low temperature tar may be subjected to an initial flash vaporization to remove as a vapor product those tar constituents boiling below a final distillation temperature in the range 300 to 425° C. Thereby the finely divided solids consisting essentially of coal and partially devolatilized coal are concentrated in the high boiling tar residue from which they may be separated by a solvent treatment. Because of the preliminary removal of the low boiling constituents, only the high boiling residue requires the further solvent processing.

Raw low temperature carbonization tar 20 is introduced into a flash vaporization vessel 21 through a conduit 22. A continuous heater 23 preferably is provided to supply the heat requirements for the flash vaporization. The heater 23 preferably is of the pipe still variety employing highly turbulent flow to avoid coking of the tar components therein. The low boiling constituents of the tar are recovered as a solids-free distillate product through a conduit 24. The distillate contains substantially all of the tar constituents boiling below a final distillation temperature in the range 300 to 425° C.

The vaporization residue is recovered from the flash vaporization vessel 21 through a conduit 25. This residue includes substantially all of the tar constituents boiling above a final temperature in the range 300 to 425° C. in admixture with the finely divided particles of coal and partially carbonized coal which are present in the original low temperature tar. The vaporization residue is introduced into a mixing vessel 26 along with about 0.75 to 3.0 parts of a solvent 27. The contents of the mixing vessel 26 are maintained under agitation at a temperature above the melting point of the vaporization residue, preferably in the range of 50–150° C. From about 50 to 95 percent of the liquid constituents of the vaporization residue are dissolved in the solvent.

Similarly as before, the properties of the solvent determine the amount of tar which is insoluble and hence rejected from solution to coalesce with the solid particles. A solvent with limited solvent properties will reject an appreciable quantity of tar to form an insoluble tacky liquid phase in which the solids are coalesced. A solvent with greater solvent properties will reject only sufficient tacky tar to bind the solid particles into agglomerate pellets. A solvent of this latter type is assumed in the aforementioned process shown in FIGURE 2.

The contents of the mixing vessel 26 are recovered through a valved conduit 28 and introduced into filtration equipment 29 for separation. The agglomerate pellets are recovered as a filter cake 30. The solids-free filtrate is recovered through a conduit 31. The solvent is separated from the filtrate in a solvent stripping vessel 32, and is recovered through a conduit 33 for reuse in the process. The high boiling, solids-free tar constituents are recovered through a conduit 34 for use as the carbon black feedstock of this invention. If desired, this material may be further treated to improve the quality of the resulting carbon black as will be hereinafter described in connection with FIGURES 3 and 4.

By employing the process of FIGURE 2, any thermal degradation of the tar resulting from distillation occurs prior to the solvent precipitation treatment. Thus thermal degradation products can be eliminated from the residue tar in the solvent precipitation treatment. Hence the process of FIGURE 2 is the preferred embodiment.

SOLVENT

The solvent employed in the present invention can perform in either of two ways.

The solvent may be one which dissolves substantially all of the low temperature tar constituents and selectively rejects only a sufficient quantity of liquid constituents to bind occluded solid particles into pellets. Such a solvent permits very high recovery of solids-free liquid tar constituents and the recovery of relatively dry agglomerated pellets of solid particles. Alternatively, the solvent may be one in which the tar constituents are less soluble, i.e., one which selectively rejects a significant portion of the low temperature tar as a heavy viscous liquid phase in which the finely divided solid particles are coalesced. With such solvents, the dissolved tar constituents are recoverable by decantation as a solids-free liquid phase. The rejected tar constituents and coalesced finely divided solid particles are recovered as a tacky slurry. Accordingly, filtration is not suitable as a means for recovering the solution of solvent and soluble tar constituents. Simple decantation, however, is quite effective for achieving the separation.

The solvents in which substantial portions of the tar are insoluble include the predominantly paraffinic or naphthenic hydrocarbons, for example, petroleum distillates or neutral coal tar distillates. Highly aromatic hydrocarbons such as benzene, toluene and xylene in general possess excellent solvent properties for coal tar and hence are unsuitable for this purpose.

The solvents in which substantially all of the tar components are soluble except for a minor quantity sufficient to form relatively dry pellets of solid particles are multi-component mixtures including (1) a material which itself is an excellent solvent for the tar and (2) a material which is a solvent for only certain portions of the tar. The two components should be wholly miscible and preferably should boil entirely within the range of 50 to 300° C. Examples of the solvent component of type (1) are phenols such as phenol itself, cresols, xylenols and higher boiling phenols; halogenated paraffins such as trichloroethylene and carbon tetrachloride; nitrogen bases such as pyridine, aniline, lutidene, quinoline; low boiling ketones such as methyl-ethyl ketone and acetone; nitrated paraffins such as nitro-methane; low boiling organic esters such as ethyl acetate and butyl acetate; olefins; and aromatic materials such as benzene, toluene, xylene.

Examples of materials of type (2) include paraffinic and naphthenic hydrocarbons. The ratio of solvent materials type (1) and type (2) for optimum results according to the present invention can be determined through routine testing with the solvent materials selected. The optimum mixture is one which is capable of rejecting from solution at an operating temperature only that quantity of tar required to bind all of the finely divided solids as an agglomerate.

While synthetically compounded solvent mixtures can be prepared for satisfactory removal of finely divided solids, nevertheless, it is preferred to employ as solvents those naturally occurring mixtures which are present and are readily recoverable from the tars themselves.

For example, a suitable solvent is a distillate fraction of neutral oils from low temperature tar boiling below about 300° C. and containing 2 to 20 percent tar acids such as phenol, cresols and xylenols. Such solvents are autogenously available within the low temperature tar itself. Hence external sources of make-up solvent are not needed. Several examples of other preferred solvents will be described.

(a) A first distillate fraction of low temperature tar boiling below about 180° C. is an excellent solvent. The lowest boiling constituent of the condensible raw tar boils at about 150° C. The lowest boiling tar acid (phenol itself) boils at about 180° C. Azeotropic phenomena permit small quantities of the tar acids to distill somewhat below their normal boiling temperature. Hence the first distillate of raw tar boiling below about 180° C. (e.g., boiling below a temperature of 170–190° C.) will contain neutral oils and 2 to 20 percent tar acids.

(b) A neutral oil distillate boiling above about 150° C. and below about 300° C. may be combined with sufficient tar acids to produce a suitable solvent.

(c) Low boiling tar acid oil (boiling above about 160° C. and below about 300° C., preferably below about 230° C.) may be refined by a solvent extraction process to produce a high purity tar acid stream and a neutral oil stream, U.S. Patent 2,666,796. The neutral oil stream produced in such solvent extraction processes may retain sufficient tar acids to possess suitable solvent properties.

In general, as the tar acid content of the solvent increases, the quantity of tar which the solvent will dissolve increases and the insoluble tar forms agglomerates with the solids in the tar. With excessive tar acids in the solvent, the insoluble portion of the tar may be inadequate to form the desired agglomerates; thus the finely divided solids are not pelleted and continue to present a difficult removal problem. With insufficient tar acids in the solvent, substantial portions of the tar remain insoluble and form a tacky, viscous liquid phase which contains tar ingredients which are beneficial in a carbon black feedstock. One volume of the selected solvent should be capable of dissolving from about 50 to 95 percent of the liquid constituents from one volume of tar. Alternatively expressed, one volume of the selected solvent should reject at least 5 and not more than 50 percent of the liquid constituents from one volume of tar.

The high boiling low temperature tar, recovered in a solids-free form as described, is suitable for use as a carbon black feedstock. High yields of carbon black can be achieved. The material boiling above about 475° C. has an average molecular weight of about 380. Hence, the vaporization characteristics of the feedstock are suitable for use in a carbon black furnace. The quality of carbon black prepared from such feedstocks will generally be somewhat inferior to that obtained from petroleum sources although the yields will be comparable.

The quality of the carbon black may be further improved by contacting the high boiling tar constituents, suitable as a carbon black feedstock, with an inert polar solvent such as aqueous methanol, containing 60 to 95 percent methanol. This treatment is illustrated in FIGURE 3 wherein the high boiling solids-free tar constituents 40 are introduced into a liquid-liquid contacting vessel 41 along with about 0.5 to 3 volumes of a polar solvent 42 such as aqueous methanol. The two liquids are brought into intimate contact by agitation or induced turbulence whereby certain of the relatively low molecular weight polar constituents of the tar are dissolved in the polar solvent. Selectively certain of the dissolved constituents include those tar components containing oxygen, sulfur and nitrogen. A phase separation occurs which permits separate recovery of the polar solvent together with its dissolved polar constituents through a conduit 43. The undissolved tar constituents, of relatively high molecular weight and of non-polar characterization, are recovered through a conduit 44 as a premium carbon black feedstock. This stream will produce high quality carbon black in high yield.

Other suitable inert polar solvents include aqueous ethanol, aqueous phenols, furfural, glycols, carboxylic acids and similar highly polar oxygenated hydrocarbons. Aldehydes and ketones are unsuitable because of their tendency to react with tar acids. Aqueous methanol is preferred as a solvent because of its relatively low cost and high efficiency.

Alternatively, as shown in FIGURE 4, the high boiling tar constituents, suitable as a carbon black feedstock, can be treated with a non-polar solvent which dissolves the predominantly non-polar tar hydrocarbonaceous constituents and leaves behind an insoluble phase containing the predominantly polar constituents such as those compounds containing oxygen, nitrogen and sulfur. As shown in FIGURE 4, the high boiling tar constituents 45 are introduced into a liquid-liquid contacting zone 46 along with about 0.5 to 3 volumes of a non-polar solvent 47. The contents of the vessel 46 are intimately admixed to effect solution of the tar in the non-polar solvent. The insoluble phase is recovered through a conduit 48. The non-polar solvent solution of soluble tar constituents is recovered through a conduit 49. The solvent is stripped from the solution in a stripping vessel 50 and recovered for reuse through a conduit 51. The tar constituents remaining after removal of the solvent are recovered as a premium carbon black feedstock through a conduit 52.

The non-polar solvent may comprise paraffinic or naphthenic hydrocarbons boiling in the range of 80 to 300° C., i.e., well below the boiling range of the solids-free tar. In general, paraffinic hydrocarbons having from 5 to 9 carbon atoms are preferred. A heptane distillate fraction of paraffinic hydrocarbons is particularly preferred because of its relatively low cost, availability and effectiveness.

Paraffinic hydrocarbons having less than five carbon atoms do not dissolve sufficient tar constituents. Hence their yield of carbon black feedstock is low. Those paraffinic hydrocarbons having more than 9 carbon atoms will dissolve large quantities of the tar constituents and thus do not selectively eliminate the tar constituents which must be removed to produce a feedstock yielding premium quality carbon black.

Figure 5:
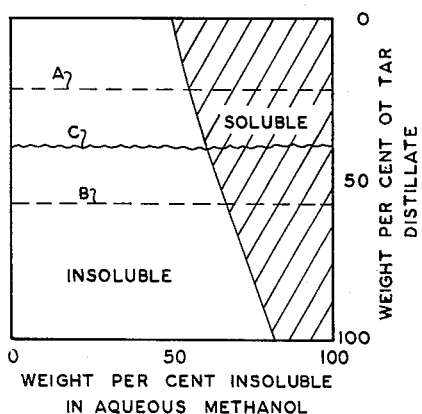
FIGURE 5 is a graphical representation of the effect of a non-polar solvent upon solids-free low temperature tar.

The general effects of an inert polar solvent on the liquid constituents of low temperature carbonization tar are illustrated in FIGURE 5. The block of FIGURE 5 represents a sample of low temperature carbonization tar. A vertical scale is provided to represent the weight percentage of the tar as distillate reading from top to bottom. A horizontal line A extends across the block representing a 300° C. distillate. A second horizontal line B extends across the block representing a 450° C. distillate. That portion of the block above the line A represents the tar distilling below 300° C., i.e., about one-fourth of the tar. That portion of the block between lines A and B represents the tar distilling between 300 and 450° C. That portion of the block below the line B represents the tar distilling above 450° C., i.e., nearly half of the tar.

Where the total tar (represented by the entire block) is contacted with aqueous methanol, that portion of the tar represented by the cross-hatched area dissolves in the aqueous methanol. The unshaded portion of the block represents the tar which is insoluble in the aqueous methanol. It is seen that the lower boiling constituents of the tar are more soluble than the higher boiling constituents, that is, nearly half of the distillate boiling below 300° C. is soluble whereas only about one-third of the tar distilling above 450° C. is soluble.

For a particular carbon black feedstock having an initial distillation temperature represented by the wavy line C in FIGURE 5 (between 300 and 450° C.), the portion of the block below the line C represents the product of the processes of FIGURE 1 or 2 except for that quantity of tar rejected along with solid particles during processing. Where this material is subjected to the alternative treatment of FIGURE 3, the product premium carbon black feedstock corresponds generally to the unshaded portion of the block (FIGURE 5) below the wavy line C. The line C is presented in a wavy form to indicate that residues obtained via flash vaporization do not achieve a precise distillation separation.

Figure 6:
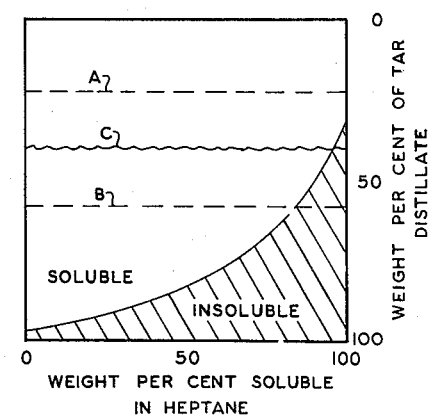
FIGURE 6 is a graphical representation of the effect of a polar solvent upon low temperature tar.

The general effects of a non-polar solvent on the liquid constituents of low temperature tar are illustrated in FIGURE 6. The block and the letters A, B, C have the same significance in FIGURE 6 as in FIGURE 5. The cross-hatched portion of FIGURE 6 represents the portion of the tar which is insoluble in a non-polar solvent, specifically n-heptane. The premium carbon black feedstock of the alternative embodiment shown in FIGURE 4 is represented generally by the unshaded portion of the block below the wavy line C in FIGURE 6.

Where a non-polar solvent such as heptane is employed for the primary solids removal process as shown in FIGURES 1 and 2, the product solids-free tar boiling above an initial temperature between 300 and 425° C. may be employed directly as a premium grade carbon black feedstock. Non-polar solvents possess only limited solubility for the liquid products of coal pyrolysis and hence will reject in the processes of FIGURES 1 and 2 a substantial quantity of tacky liquid in which the occluded solid particles will be coalesced.

The block representation concept employed in FIGURES 5 and 6 is a convenient means for illustrating the difference in effect between a solvent treating process and a distillation process. A horizontal line through a block designates a distillation, i.e., a separation of the material on the basis of boiling temperature without regard to the chemical characterization of the materials. Vertically extending lines, on the other hand, describe a separation of material on the basis of chemical characterization which occurs throughout the boiling range of the material.

CARBON BLACK FURNACES

Figure 7:
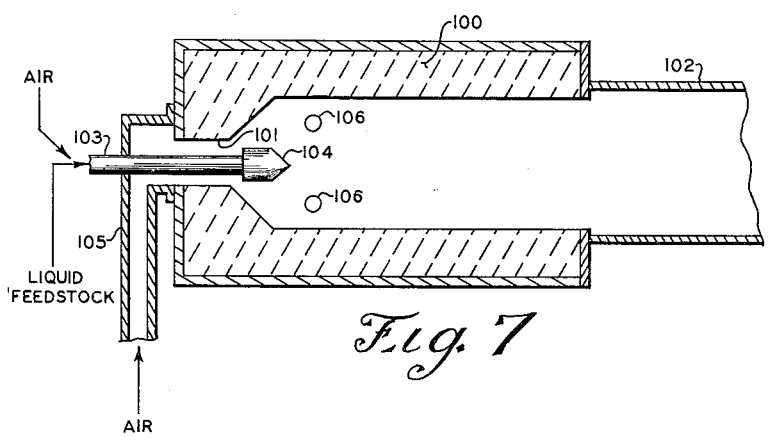
FIGURE 7 is a schematic illustration in cross-section of a typical carbon black furnace for liquid carbon black feedstock.

The preparation of carbon black from the feedstock of the present invention follows the teachings of the carbon black furnace art. FIGURE 7 illustrates schematically in cross-section a typical furnace for preparing carbon black from liquid feedstocks. A refractory lined heated chamber 100 has a throat 101 at one end and a conveying conduit 102 at the other end. A conduit 103 is positioned in the throat 101 terminating in a nozzle 104. The liquid carbon black feedstock is introduced along with a supply of air into the conduit 103. The air to feedstock ratio is maintained so that some portion of the liquid feedstock is burned and the balance is pyrolyzed in the chamber 100 to produce carbon black. Secondary air and heating fuel are introduced into the heated chamber 100 through a conduit 105 at the throat 101 and/or through tangential openings 106 in the chamber 100. The secondary air and heating fuel maintain the chamber 100 at the desired feedstock pyrolysis temperature.

LOW TEMPERATURE TAR CARBON BLACK FEEDSTOCKS

A fraction of solids-free low temperature tar was prepared in accordance with the system shown in FIGURE 1. The raw tar was obtained from a rotary kiln low temperature carbonization of Pittsburgh Seam bituminous coal. The solvent employed for removal of occluded solid particles was a solution of low boiling neutral tar oils (boiling range 180 to 230° C.) containing about 6 percent by volume of tar acids.

The solids-free soluble of the tar boiling above 335° C., which comprised 63.5 percent of the raw tar, was analyzed. Its melting point was 70° C.; its Conradson carbon content was 9.9 weight percent. Its asphaltene content was 28 percent. The asphaltenes melting point was 110° C. The ultimate analysis of the tar fraction was:

TABLE II.—*Analysis of carbon black feedstock*

| | |
|---|---|
| Hydrogen ___weight percent__ | 6.74 |
| Carbon ___do___ | 83.91 |
| Nitrogen ___do___ | 1.18 |
| Oxygen ___do___ | 6.95 |
| Sulfur ___do___ | 1.22 |
| H/C ratio | 0.957 |

The yield of carbon black from this feedstock is comparable to that obtained from petroleum derived feedstock on the basis of pounds of carbon black per gallon of feedstock.

PREMIUM CARBON BLACK FEEDSTOCK

The low temperature carbonization tar fraction described in Table II was further treated at 50° C. according to the process shown in FIGURE 3 with 75 percent aqueous methanol as a polar solvent. Two phases were separately recovered and analyzed following removal of the solvent. The same tar fraction also was treated with heptane as a non-polar solvent according to the process shown in FIGURE 4. Two phases were separately recovered and analyzed following removal of the solvent. The analytical results are set forth in the following table.

TABLE III.—*Extract and reject analysis*

| Solvent | Aqueous Methanol | | Heptane | |
|---|---|---|---|---|
| Product | Soluble Phase | Insoluble Phase | Soluble Phase | Insoluble Phase |
| Yield—Wt. Percent of whole tar | 12.7 | 50.8 | 25.4 | 38.1 |
| Asphaltenes Content, Weight Percent | 22 | 16 | 4.3 | |
| Asphaltenes, Melting Point ° C. | 90 | 115 | 135 | |
| Ultimate Analysis: | | | | |
| Hydrogen | 5.84 | 6.85 | 7.56 | 5.78 |
| Carbon | 81.21 | 85.12 | 86.29 | 81.99 |
| Nitrogen | 1.60 | 1.36 | 0.55 | 1.64 |
| Oxygen | 10.24 | 5.62 | 4.25 | 9.48 |
| Sulfur | 1.11 | 1.05 | 1.45 | 1.11 |
| H/C Ratio | 0.856 | 0.965 | 1.043 | 0.839 |

The premium grade carbon black feedstocks according to this invention are those characterized in the two center columns of Table III, i.e., the material insoluble in a polar solvent and the material soluble in a non-polar solvent. Both feedstocks contain lower concentrations of compounds having oxygen, nitrogen and sulfur. Both feedstocks have an increased H/C ratio. Both feedstocks will yield carbon black in quantities comparable to those obtained from petroleum derived sources. In addition, the carbon black produced from these feedstocks is of superior quality for rubber compounding.

SUMMARY

I have found that a hydrocarbonaceous feedstock for preparing furnace carbon black in acceptable yield can be prepared from liquid products of coal pyrolysis by recovering without vaporization thereof those materials which have not been exposed to temperatures above about 1400° F. and which (1) Boil above an initial distillation temperature between about 300 and 425° C. and (2) Are soluble in a solvent consisting of low temperature carbonization neutral oil boiling below about 300° C. and containing from about 2 to 20 percent tar acids.

The feedstock thus defined comprises from about 25 to about 75 percent of the total liquid products of coal pyrolysis.

Where a superior quality of resultant carbon black is desired, the feedstock in addition should be (a) Soluble in a paraffinic solvent having 5 to 9 carbon atoms, or (b) Insoluble in aqueous methanol containing 60 to 95 percent methanol and the balance water.

Feedstocks meeting these limitations will produce carbon black in high yield.

*Example 1.*—Low temperature tar boiling above 230° C. was treated with one volume of a solvent comprising neutral oil (boiling range 160–180° C.) containing 6 percent tar acids. The tar boiling below 230° C. had been recovered by distillation as a source of valuable low boiling tar acids and neutral oils. The soluble portion of the tar, after removal of the solvent, yielded only 70–80 percent of the carbon black obtained from acceptable petroleum-derived feedstocks at corresponding furnace conditions. Essentially, the constituents boiling between 230 and about 300 to 425° C. produced no carbon black.

Contrast this result with the fact that coke oven tar anthracene oils (boiling range from about 250 to 400° C.) are eminently suitable as carbon black feedstock.

*Example 2.*—A solids-free distillate fraction of low temperature tar boiling above 300 and below 440° C. was contacted with aqueous methanol. Both the soluble and insoluble phases were processed in a carbon black furnace. The soluble phase yielded 75.2 percent of the carbon black obtained from acceptable petroleum derived feedstock at the same furnace conditions. The insoluble phase yielded 78.7 percent of the carbon black obtained from acceptable petroleum derived feedstock at the same furnace conditions. Elimination via distillation of the tar constituents boiling above 440° C. accounted for the low yield. The quality of carbon black produced from the insoluble phase was graded as fair. The quality of carbon black produced from the soluble phase was graded as fair to poor.

Thus a distillate fraction of low temperature tar is unsuitable as a carbon black feedstock. The yield of carbon black is low and the quality only fair at best. Contrast this result with the fact that coke oven tar anthracene oil, recovered as a distillate boiling between about 250 and 400° C., is eminently suitable as a carbon black feedstock.

*Example 3.*—Low temperature tar was obtained by fluidized low temperature carbonization of Pittsburgh Seam bituminous coal mined in northern West Virginia. The tar was freed of solids by filtration under pressure.

When this solids-free tar is freed of constituents boiling below 300° C. and treated with one volume of the neutral oil and six percent phenol solvent of this invention, the soluble tar has the following distillation analysis:

| | Weight percent |
|---|---|
| Boiling below 300° C. | 0 |
| 300–350° C. | 15.5 |
| 350–400° C. | 14.6 |
| Above 400° C. | 69.9 |

The carbon black yield is between 80 and 91 percent of that obtained from petroleum-derived feedstocks at identical furnace conditions. The HAF carbon black compares in quality with that obtained from the petroleum-derived feedstock. The ISAF carbon black is slightly inferior in quality when compared to that of the petroleum-derived feedstock.

When further treated with selective solvents as described in connection with FIGURE 3 or 4, the resulting liquid carbon black feedstock produces carbon black which compares both in yield and quality with that obtained from petroleum-derived materials.

DISPOSITION OF CO-PRODUCTS OF THE PROCESS

When a carbon black feedstock is produced from coal pyrolysis products according to this invention, various novel companion products are recovered. These co-products may be profitably utilized in an integrated refinery.

Referring to FIGURES 1 and 2, the low boiling solids-free tar recovered at 18 (FIGURE 1) and 24 (FIGURE 2) contain the valuable low boiling tar acids and neutral oils as well as middle boiling tar fractions useful as creosote. Each of these materials has a recognized commercial market.

The stream of occluded solids recovered at 15 (FIGURE 1) and 30 (FIGURE 2) comprises the solid particles originally in the raw low temperature carbonization tar and some quantity of insoluble tar as a binder. Depending upon the solvent selection, the streams 15 and 30 will comprise relatively dry agglomerate pellets (as one extreme) or a tacky slurry of solids in tar (as the other extreme). The agglomerate pellets may be returned through the low temperature carbonization process of their origin as a recycle stream or may be burned directly as fuel. Preferably the pellets are vacuum dried to recover occluded solvent for reuse in the process. Tacky slurries may be blended into road tars or may be sprayed onto coal prior to or during low temperature carbonization. The slurry may be pyrolyzed to yield a coke product and cracked tar vapors which can be condensed and reintroduced into the present process.

In the embodiment of FIGURE 3, the soluble portions (in a polar solvent) of the solids-free tar recovered at 43 can be pyrolyzed to produce an essentially ash-free coke product and cracked tar vapors. The coke product may be utilized as electrode carbon. The condensed cracked tar vapors may be reintroduced into the present process. By similar treatment, the insoluble portion of the solids-free tar recovered at 48 (FIGURE 4) may be utilized.

While all of the examples herein have been derived from products of bituminous coal, it is within the scope of this invention to include pyrolysis products from analogous naturally occurring hydrocarbonaceous materials such as sub-bituminous coal, lignite, peat, oil shale, tar sands and the like.

According to the provisions of the patent statutes, I have explained the principle, preferred construction and mode of operation of my invention and have illustrated and described what I now consider to represent its best embodiment. However, I desire to have it understood that, within the scope of the appended claims, the invention may be practiced otherwise than as specifically illustrated and described.

I claim:

1. A hydrocarbonaceous carbon black feedstock derived from liquid products obtained by pyrolysis of naturally occurring hydrocarbonaceous solids, said products having been exposed only to temperatures below about 1400° F., comprising substantially all of the selective solvent-soluble solids-free liquid constituents thereof boiling above an initial boiling temperature in the range of 300 to 425° C., said selective solvent consisting essentially of a hydrocarbonaceous distillate fraction of low temperature coal carbonization tar boiling between 160 and 200° C. and containing from 2 to 20 percent tar acids.

2. A hydrocarbonaceous carbon black feedstock derived from liquid products obtained by pyrolysis of coal, said products having been exposed only to temperatures below about 1400° F., comprising substantially all of the selective solvent-soluble solids-free liquid constituents thereof boiling above an initial boiling temperature in the range of 300 to 425° C., said selective solvent consisting essentially of a distillate fraction of low temperature coal carbonization tar boiling between 160 and 200° C. and containing from 2 to 20 percent tar acids.

3. A hydrocarbonaceous carbon black feedstock derived from liquid products obtained by pyrolysis of coal, said products having been exposed only to temperatures below about 1400° F., comprising substantially all of the selective solvent-soluble solids-free liquid constituents thereof boiling above an initial boiling temperature in the range of 300 to 425° C., said selective solvent consisting essentially of a distillate fraction of low temperature coal carbonization tar boiling between 160 and 200° C. and containing from 2 to 20 percent tar acids, said feedstock comprising from about 25 to 75 percent of the total liquid products.

4. A hydrocarbonaceous carbon black feedstock derived from low temperature coal carbonization tar which has been exposed only to temperatures below about 1400° F. comprising substantially all of the selective solvent-soluble solids-free liquid constituents thereof boiling above an initial boiling temperature in the range of 300 to 425° C., said selective solvent consisting essentially of a distillate fraction of low temperature coal carbonization tar boiling between 160 and 200° C. and containing from 2 to 20 percent tar acids, said feedstock comprising from about 25 to 75 percent of the solids-free tar.

5. A hydrocarbonaceous carbon black feedstock comprising those constituents of the composition defined in claim 3 which are insoluble in aqueous methanol containing 60 to 90 percent methanol and the balance water.

6. A hydrocarbonaceous carbon black feedstock comprising those constituents of the composition defined in claim 4 which are insoluble in aqueous methanol containing 60 to 90 percent methanol and the balance water.

7. A hydrocarbonaceous carbon black feedstock comprising those constituents of the composition defined in claim 3 which are soluble in a paraffinic solvent having from 5 to 9 carbon atoms.

8. A hydrocarbonaceous carbon black feedstock comprising those constituents of the composition defined in claim 4 which are soluble in a paraffinic solvent having from 5 to 9 carbon atoms.

9. The method for preparing carbon black from coal which comprises pyrolyzing said coal at a temperature below 1400° F. to produce condensible liquid products, recovering from said liquid products at a temperature below about 1400° F. substantially all of the selective solvent-soluble constituents thereof which boil above a temperature between 300 and 425° C., said selective solvent consisting essentially of a hydrocarbonaceous distillate fraction of low temperature carbonization tar boiling between 160 and 200° C. and containing from 2 to 20 percent tar acids, introducing said constituents into a heated chamber as a spray along with a quantity of oxidizing gas sufficient to burn only a portion thereof and pyrolytically convert the remainder thereof to carbon black, and recovering carbon black from said heated chamber.

10. The method for preparing carbon black from coal which comprises pyrolyzing said coal at a temperature below 1400° F. to produce condensible liquid products, recovering from said liquid products at a temperature below about 1400° F. substantially all of the constituents thereof which boil above a temperature between 300 and 425° C. and which are firstly soluble in a solvent consisting essentially of a hydrocarbonaceous distillate fraction of low temperature carbonization tar boiling between 160 and 200° C. and containing from 2 to 20 percent tar acids, and secondly soluble in a paraffinic solvent having from 5 to 9 carbon atoms, introducing said constituents into a heated chamber as a spray along with a quantity of oxidizing gas sufficient to burn only a portion thereof and pyrolytically convert the remainder thereof to carbon black, and recovering carbon black from said heated chamber.

11. The method for preparing carbon black from coal which comprises pyrolyzing said coal at a temperature below 1400° F. to produce at a temperature below about 1400° F. condensible liquid products, recovering from said liquid products substantially all of the constituents thereof which boil above a temperature between 300 and 425° C. and which are firstly soluble in a solvent consisting essentially of a hydrocarbonaceous distillate fraction of low temperature carbonization tar boiling between 160 and 200° C. and containing from 2 to 20 percent tar acids, and secondly insoluble in aqueous methanol containing 60–90 percent methanol and the balance water, introducing said constituents into a heated chamber as a spray along with a quantity of oxidizing gas sufficient to burn only a portion thereof and pyrolytically convert the remainder thereof to carbon black, and recovering carbon black from said heated chamber.

12. The method for preparing a carbon black feedstock from coal which comprises pyrolyzing said coal at a tempertaure below 1400° F. to produce condensible liquid products, contacting at least a portion thereof including substantially all of said liquid products boiling above an initial temperature between 300 and 425° C. with 0.75 to 3.0 times its volume of a solvent consisting of a hydrocarbonaceous distillate fraction of low temperature carbonization tar boiling below 300° C. and containing from 2 to 20 percent tar acids, separating the resulting solvent solution from the insoluble components and distilling the solution to remove substantially all constituents boiling below a temperature between 350 and 425° C. and recovering the distillation residue as a carbon black feedstock.

13. The method of claim 12 wherein the solvent comprises a first distillate fraction of low temperature carbonization tar boiling below a distillation temperature between 170 and 190° C.

14. The method for preparing a carbon black feedstock from coal which comprises pyrolyzing said coal at a temperature below 1400° F. to produce condensible liquid products, removing by distillation those constituents of said liquid products boiling below a temperature between 350 and 425° C., contacting the high boiling residue of said distillation with 0.75 to 3.0 times its volume of a solvent consisting of a hydrocarbonaceous distillate fraction of low temperature carbonization tar boiling below 300° C. and containing from 2 to 20 percent tar acids, separating the resulting solvent solution from the insoluble components at a temperature above the melting point of said residue, distilling the solution to remove substantially all of said solvent and recovering the solvent-free constituents from the solution as a carbon black feedstock.

15. The method for preparing a carbon black feedstock from coal which comprises pyrolyzing said coal at a temperature below 1400° F. to produce condensible liquid products, contacting at least a portion thereof including substantially all of said liquid products boiling above an initial temperature between 300 and 425° C. with 0.75 to 3.0 times its volume of a solvent consisting of a hydrocarbonaceous distillate fraction of low temperature carbonization tar boiling below 300° C. and containing from 2 to 20 percent tar acids, separating the resulting solvent solution from the insoluble components and distilling the solution to remove substantially all constituents boiling below a temperature between 350 and 425° C., contacting the distillation residue with 0.5 to 3.0 volumes of aqueous methanol containing 60 to 90 percent methanol and recovering the insoluble constituents as a carbon black feedstock.

16. The method for preparing a carbon black feedstock from coal which comprises pyrolyzing said coal at a temperature below 1400° F. to produce condensible liquid products, contacting at least a portion thereof including substantially all of said liquid products boiling above an initial temperature between 300 and 425° C. with 0.75 to 3.0 times its volume of a solvent consisting of a hydrocarbonaceous distillate fraction of low temperature carbonization tar boiling below 300° C. and containing from 2 to 20 percent tar acids, separating the resulting solvent solution from the insoluble components and distilling the solution to remove substantially all constituents boiling below a temperature between 350 and 425° C., contacting the distillation residue with 0.5 to 3.0 volumes of paraffinic hydrocarbons having from 5 to 9 carbon atoms and recovering the tar constituents soluble in said hydrocarbons as a carbon black feedstock.

References Cited in the file of this patent

UNITED STATES PATENTS

| | | |
|---|---|---|
| 1,438,032 | Frost | Dec. 5, 1922 |
| 2,188,015 | Schick | Jan. 23, 1940 |
| 2,617,714 | Arnold | Nov. 11, 1952 |
| 2,631,982 | Donegan | Mar. 17, 1953 |
| 2,666,796 | Gorin et al. | Jan. 19, 1954 |
| 2,774,716 | Kulick | Dec. 18, 1956 |
| 2,794,710 | Lawson | June 4, 1957 |

FOREIGN PATENTS

| | | |
|---|---|---|
| 695,492 | Great Britain | Aug. 12, 1953 |